United States Patent
Zheng et al.

(10) Patent No.: US 11,366,212 B2
(45) Date of Patent: Jun. 21, 2022

(54) TWO-STEP CODE GENERATOR FOR PHASE CODED FREQUENCY MODULATED CONTINUOUS WAVE (FMCW) MULTI INPUT MULTI OUTPUT (MIMO) RADAR

(71) Applicant: Aptiv Technologies Limited, St. Michael (BB)

(72) Inventors: Le Zheng, Agoura Hills, CA (US); Yu Zhang, Thousand Oaks, CA (US); Xin Zhang, Calabasas, CA (US)

(73) Assignee: Aptiv Technologies Limited, St. Michael (BB)

( * ) Notice: Subject to any disclaimer, the term of this patent is extended or adjusted under 35 U.S.C. 154(b) by 302 days.

(21) Appl. No.: 16/788,394

(22) Filed: Feb. 12, 2020

(65) Prior Publication Data
US 2021/0247507 A1    Aug. 12, 2021

(51) Int. Cl.
*G01S 13/32* (2006.01)
*G01S 7/35* (2006.01)

(52) U.S. Cl.
CPC .............. *G01S 13/325* (2013.01); *G01S 7/35* (2013.01)

(58) Field of Classification Search
None
See application file for complete search history.

(56) References Cited

U.S. PATENT DOCUMENTS

| | | | |
|---|---|---|---|
| 9,952,319 B2 | 4/2018 | Searcy et al. | |
| 10,270,498 B2 | 4/2019 | Fu | |
| 10,333,421 B2* | 6/2019 | Logan | G01S 7/36 |
| 2018/0041317 A1* | 2/2018 | Simonsson | H04L 5/0048 |

OTHER PUBLICATIONS

Deng Hai et al: "Mimo radar waveform design for transmit beamforming and orthogonality," IEEE Transactions on Aerospace and Electronic Systems, IEEE Service Center, Piscataway, NJ, US, vol. 52, No. 3, Jun. 1, 2016, pp. 1421-1433, ISSN: 0018-9251, DOI: 10.1109/ TAES.2016.140023 [retrieved on Jul. 13, 2016].

Dali Liu et al: "Orthogonal polyphase code sets design for MIMO radar using Tabu Search," Intelligent Control, Automatic Detection and High-End Equipment (ICADE), 2012 IEEE International Conference On, IEEE, Jul. 27, 2012, pp. 123-127, XP032251693, DOI: 10.1109/icade.2012.6330112, ISBN: 978-1-4673-1331-5.

(Continued)

*Primary Examiner* — Whitney Moore
(74) *Attorney, Agent, or Firm* — Carlson, Gaskey & Olds, P.C.

(57) ABSTRACT

A two-step optimization method for scheduling transmissions in an MIMO (multi-input multi-output) includes determining a first phase code for each transmission according to a first equation, placing each first phase code in a set of first phase codes, and determining a cost function of the set of first phase codes, determining a second phase code for each transmission according to a second equation, determining an updated cost function corresponding to replacing each of the first phase codes with a corresponding one of the second phase codes, and determining which set of phase codes has a smaller cost function.

14 Claims, 3 Drawing Sheets

(56) References Cited

OTHER PUBLICATIONS

Jardak Seifallah et al: "Generation of Correlated Finite Alphabet Waveform Using Gaussian Random Variables," IEEE Transactions on Signal Processing, IEEE Service Center, New York, NY, US, vol. 62, No. 17, Sep. 1, 2014, pp. 4587-4596, XP011555922, ISSN: 1053-587X, DOI: 10.1109/TSP.2014.2339800 [retrieved on Aug. 8, 2014].

Ren Wei et al: "Greedy Code Search Based Memetic Algorithm for the Design of Orthogonal Polyphase Code Sets," IEEE Access, vol. 7, Jan. 21, 2019, pp. 13561-13576, XP011709929, DOI: 10.1109/ACCESS.2019.2893970 [retrieved on Feb. 7, 2019].

Extended European Search Report for Application No. EP 21 15 2008 dated May 25, 2021.

Hai Deng, 1996 "Synthesis of binary sequences with good autocorrelation and crosscorrelation properties by simulated annealing" IEEE Transactions on Aerospace and Electronic Systems, vol. 32, Issue: 1.

Dali Liu, Yuntao Liu, Huizhi Cai, 2012 "Orthogonal Polyphase Codes Sets Design for MIMO Radar Using Tabu Search" 2012 IEEE International Conference on Intelligent Control, Automatic Detection and High-End Equipment (ICADE).

B. Roja Reddy, 2012 "Polyphase Orthogonal Waveform Using Modified Particle Swarm Optimization Algorithm for MIMO Radar", 2012 IEEE International Conference on Signal Processing, Computing and Control (ISPCC).

Reinhard Feger et. al. 2016 "Optimization of Codes and Weighting Functions for Binary Phase-Coded FMCW MIMO Radars," 2016 IEEE MTT-S International Conference on Microwaves for Intelligent Mobility (ICMIM).

\* cited by examiner

TWO-STEP CODE GENERATOR FOR PHASE CODED FREQUENCY MODULATED CONTINUOUS WAVE (FMCW) MULTI INPUT MULTI OUTPUT (MIMO) RADAR

TECHNICAL FIELD

The present disclosure relates generally to phase coded frequency modulated continuous wave MIMO radar, and more specifically to a two-step code generation for the same.

BACKGROUND

Multi-input Multi-output (MIMO) radar is a type of phased array radar and employs digital receivers and waveform generators distributed across the aperture. MIMO radar signals propagate similar to multistatic radar. However, instead of distributing the radar elements throughout the surveillance area, antennas are closely located to obtain better spatial resolution, doppler resolution, and dynamic range. MIMO radar may also be used to obtain low-probability-of-intercept radar properties. To improve MIMO radar systems, the systems are designed with orthogonal signals to support simultaneous transmission from multiple antennas.

Existing methodologies to design orthogonal signal based systems apply a random offset to a conventional linear frequency modulation (LFM) signal for the frequency modulated continuous wave MIMO radar operation. Some physical systems are incapable of supporting such a random offset, or are suboptimal while implementing such a system.

SUMMARY OF THE INVENTION

In one example, a multi-input multi-output (MIMO) radar system includes a plurality of antenna, each antenna including at least one transmitter and at least one receiver arranged in a collocated configuration, a controller including a non-transitory memory storing instructions for causing the controller to schedule transmissions from the plurality of antenna via determining a first phase code for each transmission according to a first equation, placing each first phase code in a set of first phase codes, and determining a cost function of the set of first phase codes and determining a second phase code for each transmission according to a second equation, determining an updated cost function corresponding to replacing each of the first phase codes with a corresponding one of the second phase codes and determining which set of phase codes has a smaller cost function.

In another example of the above described MIMO radar system, the first phase code for each transmission is determined with consideration to only phase codes already determined.

In another example of any of the above described MIMO radar systems, the cost function of the first set of phase codes is determined via equation 1.

In another example of any of the above described MIMO radar systems, the second phase code for each transmission is determined with consideration to phase codes corresponding to all transmitters in the plurality of antenna.

In another example of any of the above described MIMO radar systems, the second phase code for each transmission is determined via equation 2.

In another example of any of the above described MIMO radar systems, each phase code in the first set of phase codes is a Binary Phase Shift Keying Modulation (BPSK) phase code.

In another example of any of the above described MIMO radar systems, each phase code in the second set of phase codes is a Binary Phase Modulation (BPM) phase code.

In one example, a two-step optimization method for scheduling transmissions includes determining a first phase code for each transmission according to a first equation, placing each first phase code in a set of first phase codes, and determining a cost function of the set of first phase codes, determining a second phase code for each transmission according to a second equation, determining an updated cost function corresponding to replacing each of the first phase codes with a corresponding one of the second phase codes, and determining which set of phase codes has a smaller cost function.

In another example of the above two-step optimization method for scheduling transmissions, the first phase code for each transmission is determined with consideration to only phase codes already determined.

In another example of any of the above two-step optimization methods for scheduling transmissions, the cost function of the first set of phase codes is determined via equation 1.

In another example of any of the above two-step optimization methods for scheduling transmissions, the second phase code for each transmission is determined with consideration to phase codes corresponding to all transmitters in a plurality of antenna.

In another example of any of the above two-step optimization methods for scheduling transmissions, the second phase code for each transmission is determined via equation 2.

In one example, a method for optimizing a multi-input multi-output radar transmission includes initializing an array of phase codes using a first phase code generation process, the array of phase codes including a phase code corresponding to each of multiple transmitting antenna, generating a cost function of the array of phase codes, determining a second phase code for a first transmitting antenna in the multiple transmitting antennas and generating an updated cost function replacing the first phase code corresponding to the first antenna with the second phase code corresponding to the first antenna, comparing the updated cost function to the cost function and replacing the cost function with the updated cost function in response to the updated cost function being smaller than the cost function, and iterating the step of determining the second phase code for the first transmitting antenna in the multiple transmitting antennas and generating an updated cost function replacing the first phase code corresponding to the first antenna with the second phase code corresponding to the first antenna, comparing the updated cost function to the cost function and replacing the cost function with the updated cost function in response to the updated cost function being smaller than the cost function until the cost function has either converged or reached a maximum.

In another example of the above method, the first cost function is generated using equation 1.

In another example of any of the above methods, each updated cost function is generated using equation 2.

In another example of any of the above methods, initializing the array of phase codes using the first phase code generation process includes iteratively generating phase codes.

In another example of any of the above methods, each iteratively generated phase code is optimized for previously generated phase codes and is not optimized for prospectively generated phase codes.

In another example of any of the above methods, each phase code in the array of phase codes is a Binary Phase Shift Keying Modulation (BPSK) phase code.

In another example of any of the above methods, each phase code in the array of phase codes is a Binary Phase Modulation (BPM) phase code.

In another example of any of the above methods, the step of determining the second phase code for the first transmitting antenna in the multiple transmitting antennas and generating an updated cost function replacing the first phase code corresponding to the first antenna with the second phase code corresponding to the first antenna, comparing the updated cost function to the cost function and replacing the cost function with the updated cost function in response to the updated cost function being smaller than the cost function until the cost function has either converged or reached a maximum includes is iterated once for each phase code in the array of phase codes.

These and other features of the present invention can be best understood from the following specification and drawings, the following of which is a brief description.

DETAILED DESCRIPTION

Figure 1:
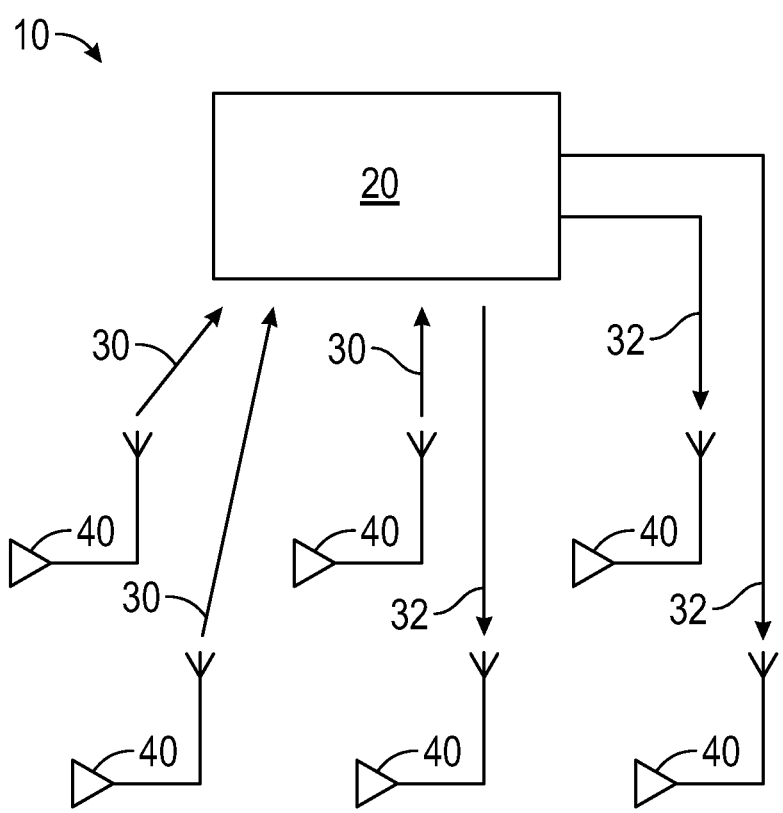
FIG. 1 illustrates an exemplary multi-input multi-output radar system.

FIG. 1 schematically illustrates an exemplary collocated multi-input multi-output (MIMO) radar system 10. The exemplary system 10 includes a primary system 20 including a transmitter and receiver simultaneously receiving multiple transmissions 30, and sending out multiple transmissions 32 to and from remote antennas 40. MIMO radar systems, such as the exemplary system 10, are systems of multiple antennas 40. Each of the antennas includes collocated transmit and receive components. Each transmitting antenna 40 radiates an arbitrary waveform independently of the other transmitting antennas 40. Each receiving antenna 40 can receive the signals 30 from the transmitting antennas 40. Due to the different waveforms, the echo signals can be re-assigned to a single transmitter 40. From an antenna field of N transmitters 40, where N is the number of transmitting antennas 40, and a field of K receivers 40, where K is the number of receiving antenna 40, mathematically results in a virtual field of K·N elements with an enlarged size of a virtual aperture. While illustrated in the example system 10 as three concurrently transmitting antennas 40 and three concurrently receiving antennas 40, it is understood that the number of concurrent transmissions and receipts can be substantially larger in a practical implementation and three of each are illustrated in the example system 10 for clarity. The utilization of collocated antenna 40 improves the degrees of freedom of the transmitting end and allows for more degrees of freedom, higher target parameter identifiability and a higher angular resolution.

In order to optimize transmissions between the antennas 40, Binary Phase Shift Keying Modulation (BPSK) or Binary Phase Modulation (BPM) is applied to each transmitter via a controller 22 included within the primary system 20, with the controller 22 including a non-transitory memory storing instructions for causing the controller 22 to implement the scheduling process described below.

Assuming a system 10 having P transmission channels, P phase codes are required in order to implement the corresponding optimization system. Directly running the phase code optimization can lead, in some systems, to exponential increases in computational difficulty. When it does, current systems can perform sub optimally, or not at all depending on the hardware implementing the MIMO system 10.

In order to optimize the phase codes, the system 10 uses a stack containing the phase codes, with the stack being an N×1 vector for the each transmission in the stack, where N is the total number of inputs in the MIMO radar system 10. Once the first transmission is on the stack, the initial phase code design of the second transmission is placed on the stack, and this is iterated until there are P codes on the stack. Thus, in the first step, the optimization system used in the system 10 optimizes each phase code as it is put on the stack, rather than optimizing the entire stack each time a phase code is added to the stack, thereby avoiding the exponential computational complexity. The stack generated by the first step is referred to as the first set of phase codes.

As the design of each phase code only considers the mutual interference to the phase codes already included in the stack, the performance of the phase code decreases as the number of transmissions increases. In order to reduce the degradation of performance, the second optimization step occurs after the full transmission stack has been generated, and considers all of the transmission codes in the stack. The second step constructs a second set of phase codes and compares the second set of phase codes to the first set of phase codes to determine which set has a smaller cost function.

Figure 2:
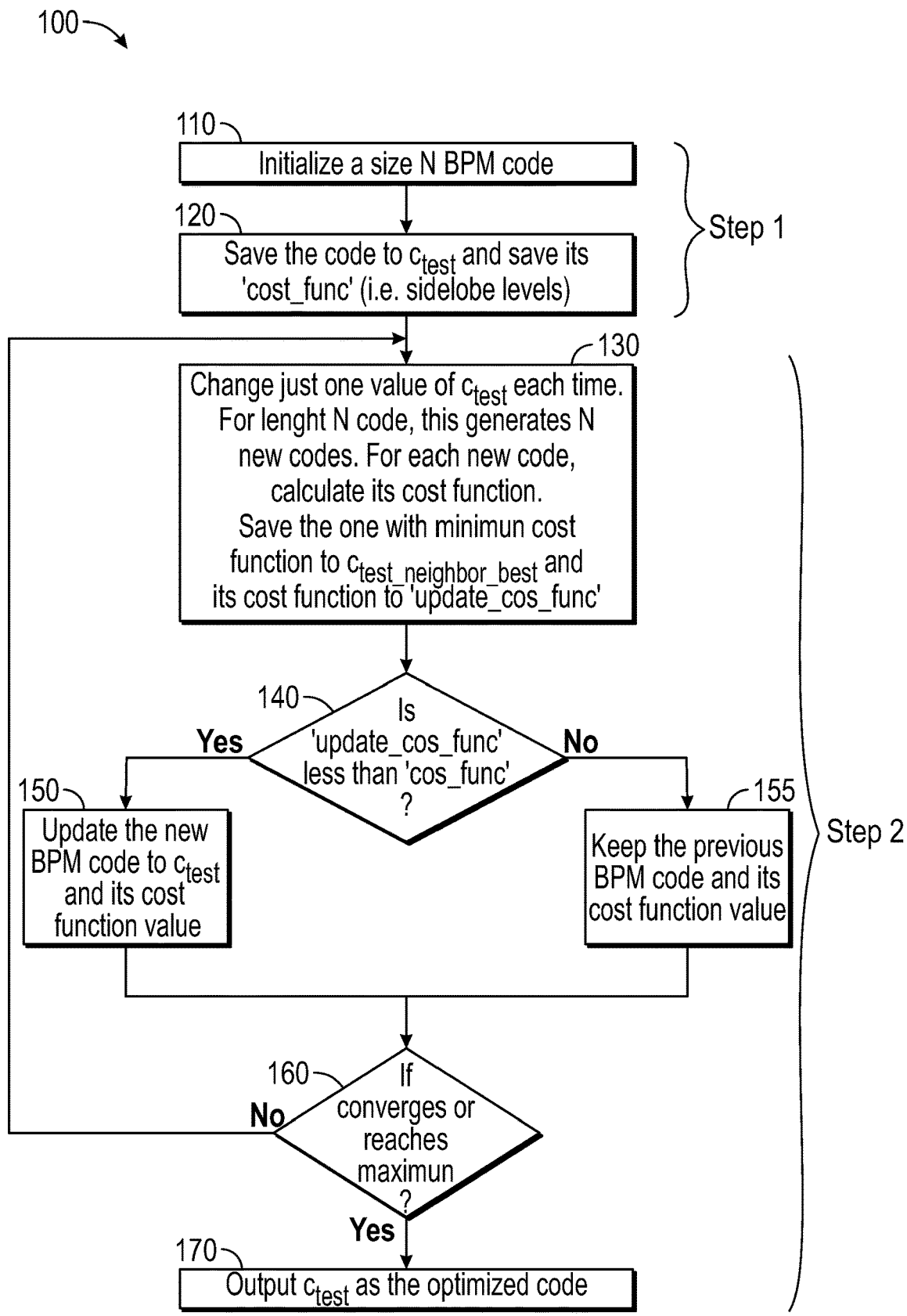
FIG. 2 schematically illustrates a particle swarm optimization for the multi-input multi-output radar system of FIG. 1.

With continued reference to FIG. 1, FIG. 2 illustrates an exemplary optimization process 100 implemented in the exemplary system 10. The two-step MIMO code optimization process 100 is described with regards to a Binary Phase Modulation based phase code. One of skill in the art can adopt the process 100 to function with BPSK modulation.

Initially a size N BPM code is generated, where N is the number of transmitting antenna 40 in the system 10 in an initialization step 110. Once the initial BPM code is determined, the code is saved as a test array ($C_{test}$), and the level of sidelobes (referred to as the arrays cost function) is determined in a generate $C_{test}$ step 120. The initialization step is repeated until the full array is created, resulting in P transmission codes. The initialization step 110 and the generate $C_{test}$ step 120 combined form the first step (step 1) of the two-step algorithm disclosed herein, with the remainder combining to form the second step (step 2) of the two step algorithm.

Once the initial codes have been determined the system 100 iterates the generation of $C_{test}$ by changing one value of $C_{test}$ each iteration to generate N new codes in a generate new codes step 130. After generation of each new code, the cost function of the new code is calculated and compared to the cost function of the previous Nth code in a comparison step 140. If the cost function of the updated code is less than the cost function of the previously saved code, then the new BPM code is saved to the $C_{test}$ code and replaces the old Nth code in a replacement step 150. If, instead, the updated cost function is not less than the previous cost function of the Nth code, the new BPM code is discarded and the existing BPM code is maintained in a maintain code step 155.

After each code is either replaced or maintained, the process 100 determines if the phase code $C_{test}$ has converged, or has reached a maximum cost function value in a check for optimization step 160. If the code has not converged or reached the maximum cost function value, the optimization process 100 returns to the generate new codes step 130, and changes the next $C_{test}$ value. If the phase code $C_{test}$ has converged or reached the maximum cost function value, the code is output as the optimized code in an output step 170.

With continued reference to the general optimization procedure described above, and illustrated in FIG. 1, one example implementation of an exemplary specific optimization process.

In the first step (step 1) the codes $c_1, c_2, \ldots, c_Q$ for transmission 1, transmission 2, . . . , transmission Q (where Q is the transmissions number) are generated. In order to generate the next code for the stack, the algorithm searches the codes for $c_{Q+1}$ using a particle swarm algorithm. The code vector $c_{test}$ is initialized with values at +1 and at −1. This size of the code vector is N by 1, where N is the code length. Then, the searching process is run to minimize a given cost function. Note that a low DC component and small sidelobe for the waveform is desirable and the cost function is given by equation (1) below.

$$f(c_{Q+1}) = \sum_{q=1}^{Q} \max|DFT(c_q c_{Q+1} w)| + \sum_{q=1}^{Q} a[|DFT(c_q c_{Q+1} w)|]_{center\_bins} \quad (1)$$

In equation (1), w is a Chebyshev window, a is an adjustable weighting coefficient, DFT(g) is the discrete Fourier transform. At this stage, the code optimization only considers the previous transmissions, so the performance of each of the codes decreases as Q increases.

To avoid the degradation, and make the performance of the channels more balanced, the code is optimized in step 2 for R=2, 3, . . . P with an updated cost function defined in equation (2).

$$g(c_R) = \sum_{q=1, q \neq R}^{P} \max|DFT(c_q c_R w)| + \sum_{q=1, q \neq R}^{P} a[|DFT(c_q c_R w)|]_{center\_bins} \quad (2)$$

Figure 3:
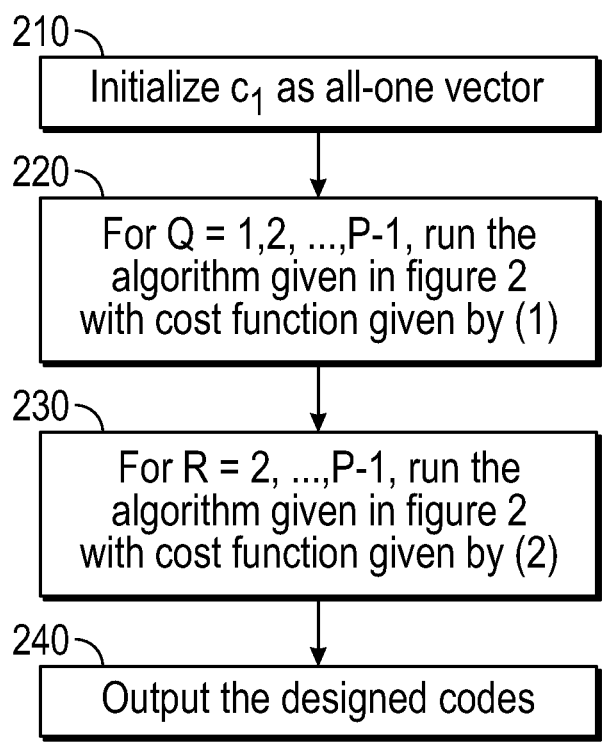
FIG. 3 schematically illustrates a two-step optimization of the particle swarm optimization of FIG. 2.

With continued reference to FIGS. 1 and 2, FIG. 3 illustrates the end code design using the following steps. Initially $c_1$ is set as all-one vector in an initialize vector step 210. Once initialized, the optimization process of FIG. 2 is applied use the cost function defined in equation 1 for Q=1, 2, . . . , P−1, and the codes are initialized randomly in a first cost function generation step 220. Once all of the codes are initialized, step 2 of the optimization process is operated. In step 2, the updated cost function is determined according to equation 2 for R=2, 3, . . . , P in a second cost function generation step 230, where R is the index of the channel for code optimization. Once the updated cost function has been determined by equation 2, the comparison step 140 (shown in FIG. 2) is performed, and the end result is saved, or not saved according to steps 150, 155. Finally, the phase codes are output in an optimized form in the output step 240, 170.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A multi-input multi-output (MIMO) radar system comprising:
    a plurality of antenna, each antenna including at least one transmitter and at least one receiver arranged in a collocated configuration;
    a controller including a non-transitory memory storing instructions for causing the controller to schedule transmissions from the plurality of antenna via determining a first phase code for each transmission according to a first equation, placing each first phase code in a set of first phase codes, and determining a cost function of the set of first phase codes and determining a second phase code for each transmission according to a second equation, determining an updated cost function corresponding to replacing each of the first phase codes with a corresponding one of the second phase codes and determining which set of phase codes has a smaller cost function;
    wherein the cost function of the first set of phase codes is determined via equation 1:

$$f(c_{Q+1}) = \sum_{q=1}^{Q} \max|DFT(c_q c_{Q+1} w)| + \sum_{q=1}^{Q} a[|DFT(c_q c_{Q+1} w)|]_{center\_bins},$$

where w is a Chebyshev window, a is an adjustable weighting coefficient, DFT(☐) is the discrete Fourier transform; and
    wherein the cost function of the second phase code for each transmission is determined via equation 2:

$$g(c_R) = \sum_{q=1, q \neq R}^{P} \max|DFT(c_q c_R w)| + \sum_{q=1, q \neq R}^{P} a[|DFT(c_q c_R w)|]_{center\_bins},$$

where w is a Chebyshev window, a is an adjustable weighting coefficient, DFT(☐) is the discrete Fourier transform.

2. The MIMO radar system of claim 1 wherein the first phase code for each transmission is determined with consideration to only phase codes already determined.

3. The MIMO radar system of claim 1, wherein the second phase code for each transmission is determined with consideration to phase codes corresponding to all transmitters in the plurality of antenna.

4. The MIMO radar system of claim 1, wherein each phase code in the first set of phase codes is a Binary Phase Shift Keying Modulation (BPSK) phase code.

5. The MIMO radar system of claim 1, wherein each phase code in the second set of phase codes is a Binary Phase Modulation (BPM) phase code.

6. A two-step optimization method for scheduling transmissions comprising:
    determining a first phase code for each transmission;
    placing each first phase code in a set of first phase codes, and determining a cost function of the set of first phase codes, wherein the cost function of the first set of phase codes is determined via equation 1:

$$f(c_{Q+1}) = \sum_{q=1}^{Q} \max|DFT(c_q c_{Q+1} w)| + \sum_{q=1}^{Q} a[|DFT(c_q c_{Q+1} w)|]_{center\_bins},$$

where w is a Chebyshev window, a is an adjustable weighting coefficient, DFT(□) is the discrete Fourier transform;

determining a second phase code for each transmission;

determining an updated cost function corresponding to replacing each of the first phase codes with a corresponding one of the second phase codes, wherein the updated cost function of the second phase code for each transmission is determined via equation 2:

$$g(c_R) = \sum_{q=1, q \neq R}^{P} \max|DFT(c_q c_R w)| + \sum_{q=1, q \neq R}^{P} a[|DFT(c_q c_R w)|]_{center\_bins},$$

where w is a Chebyshev window, a is an adjustable weighting coefficient, DFT(□) is the discrete Fourier transform; and determining which set of phase codes has a smaller cost function.

7. The two-step optimization system of claim 6 wherein the first phase code for each transmission is determined with consideration to only phase codes already determined.

8. The two-step optimization system of claim 6, wherein the second phase code for each transmission is determined with consideration to phase codes corresponding to all transmitters in a plurality of antenna.

9. A method for optimizing a multi-input multi-output radar transmission comprising:

initializing an array of phase codes using a first phase code generation process, the array of phase codes including a phase code corresponding to each of multiple transmitting antenna;

generating a cost function of the array of phase codes;

determining a second phase code for a first transmitting antenna in the multiple transmitting antennas and generating an updated cost function replacing the first phase code corresponding to the first antenna with the second phase code corresponding to the first antenna, comparing the updated cost function to the cost function and replacing the cost function with the updated cost function in response to the updated cost function being smaller than the cost function; and iterating the step of determining the second phase code for the first transmitting antenna in the multiple transmitting antennas and generating an updated cost function replacing the first phase code corresponding to the first antenna with the second phase code corresponding to the first antenna, comparing the updated cost function to the cost function and replacing the cost function with the updated cost function in response to the updated cost function being smaller than the cost function until the cost function has either converged or reached a maximum;

wherein the cost function of the first set of phase codes is determined via equation 1:

$$f(c_{Q+1}) = \sum_{q=1}^{Q} \max|DFT(c_q c_{Q+1} w)| + \sum_{q=1}^{Q} a[|DFT(c_q c_{Q+1} w)|]_{center\_bins},$$

where w is a Chebyshev window, a is an adjustable weighting coefficient, DFT(□) is the discrete Fourier transform; and wherein the cost function of the second phase code for each transmission is determined via equation 2:

$$g(c_R) = \sum_{q=1, q \neq R}^{P} \max|DFT(c_q c_R w)| + \sum_{q=1, q \neq R}^{P} a[|DFT(c_q c_R w)|]_{center\_bins},$$

where w is a Chebyshev window, a is an adjustable weighting coefficient, DFT(□) is the discrete Fourier transform.

10. The method of claim 9, wherein initializing the array of phase codes using the first phase code generation process comprises iteratively generating phase codes.

11. The method of claim 10, wherein each iteratively generated phase code is optimized for previously generated phase codes and is not optimized for prospectively generated phase codes.

12. The method of claim 9, wherein each phase code in the array of phase codes is a Binary Phase Shift Keying Modulation (BPSK) phase code.

13. The method of claim 9, wherein each phase code in the array of phase codes is a Binary Phase Modulation (BPM) phase code.

14. The method of claim 9, wherein the step of determining the second phase code for the first transmitting antenna in the multiple transmitting antennas and generating an updated cost function replacing the first phase code corresponding to the first antenna with the second phase code corresponding to the first antenna, comparing the updated cost function to the cost function and replacing the cost function with the updated cost function in response to the updated cost function being smaller than the cost function until the cost function has either converged or reached a maximum comprises is iterated once for each phase code in the array of phase codes.

* * * * *